US007260389B2

(12) United States Patent
Allen et al.

(10) Patent No.: US 7,260,389 B2
(45) Date of Patent: Aug. 21, 2007

(54) MOBILE PLATFORM DISTRIBUTED DATA LOAD MANAGEMENT SYSTEM

(75) Inventors: David Allen, Kent, WA (US); Bijan Honari, Everett, WA (US); John Sims, Littleton, CO (US); Mary A Nakasone, Bothell, WA (US); Bruce Pollock, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/176,831

(22) Filed: Jul. 7, 2005

(65) Prior Publication Data
US 2007/0010236 A1    Jan. 11, 2007

(51) Int. Cl.
H04M 3/00  (2006.01)
H04Q 7/20  (2006.01)
(52) U.S. Cl. ............. 455/419; 455/418; 455/420; 455/431
(58) Field of Classification Search ...... 455/3.01–3.03, 455/2.01, 403, 431, 414.1, 418–420, 423–425, 455/427–430, 560, 410–411, 556.1–556.2, 455/557–558, 95–96, 550.1, 517, 66.1–66.11, 455/3.05, 11.1, 88, 412.1, 412.2, 466, 431.3, 455/41.1–41.3, 507–508, 98–99; 717/168–178, 717/120–121, 130–131, 134, 151, 158; 709/220–222; 701/24, 29; 370/316, 323, 325; 379/201.05
See application file for complete search history.

(56) References Cited

U.S. PATENT DOCUMENTS 5,894,323 A * 4/1999 Kain et al. ............... 348/116
5,974,454 A   10/1999 Apfel et al.

(Continued)

FOREIGN PATENT DOCUMENTS
WO    WO 99/45465    9/1999

(Continued)

OTHER PUBLICATIONS

Cellular Networking Perspectives, 2002, http://www.cnp-wireless.com/ArticleArchive/Wireless20Telecom/2002Q3-SMSIntrworking.htm.

(Continued)

Primary Examiner—Meless Zewdu
(74) Attorney, Agent, or Firm—Harness, Dickey & Pierce, P.L.C.

(57) ABSTRACT

A method for loading software items on a mobile platform computer based system includes storing published content in a published content repository of a distributed data manager system (DDMS) included in the DDLMS. At least one assigned software part generated using the published content from the published content repository is stored in a DDMS fleet content repository. The assigned software part is communicated to the staging area repository of OCS platform over a secure link. The staged software part is transferred to an installed software parts repository of the OCS after the entire software part is staged in the staging area repository.

23 Claims, 3 Drawing Sheets

U.S. PATENT DOCUMENTS

| | | | |
|---|---|---|---|
| 6,064,922 A * | 5/2000 | Lee | 701/3 |
| 6,173,159 B1 | 1/2001 | Wright et al. | |
| 6,266,736 B1 * | 7/2001 | Atkinson et al. | 711/103 |
| 6,816,728 B2 * | 11/2004 | Igloi et al. | 455/431 |
| 6,859,688 B1 * | 2/2005 | Orf et al. | 701/3 |
| 6,894,611 B2 * | 5/2005 | Butz et al. | 340/539.1 |
| 7,020,708 B2 * | 3/2006 | Nelson et al. | 709/230 |
| 2003/0003872 A1 * | 1/2003 | Brinkley et al. | 455/66 |
| 2003/0061435 A1 * | 3/2003 | Ferguson et al. | 711/103 |
| 2004/0056766 A1 * | 3/2004 | Butz et al. | 340/539.1 |
| 2005/0026608 A1 * | 2/2005 | Kallio et al. | 455/431 |
| 2006/0047382 A1 * | 3/2006 | Nguyen | 701/29 |

FOREIGN PATENT DOCUMENTS

| WO | WO 02/079918 | 10/2002 |
|---|---|---|

OTHER PUBLICATIONS

Wireless Messaging Suite, Mobile Messaging Platform, http://www.hssworld.com/commapps/smsc/faq.htm.

Flextronics Software Systems, FAQs; http://www.hssworld.com/commapps/smsc/faq.htm.

Core—Free FTP client software—Core FTP LE; http://www.coreftp.com.

Tucows, PC Police Professional; http://www.tucows.com/preview/342212.

Download Managers—Free Software; http://freeware.intrastar.net/downloads.htm.

Microsoft Office Online, About e-mailk security; 2005; http://office.microsoft.com/en-us/assistance/HP030834341033.aspx.

* cited by examiner

MOBILE PLATFORM DISTRIBUTED DATA LOAD MANAGEMENT SYSTEM

FIELD OF INVENTION

The invention relates generally to the transfer of mobile platform configuration data from mobile platform provider central data systems to systems onboard the mobile platform. More particularly, the invention relates to automatically staging configuration data onboard the mobile platform so that the configuration data can be installed in onboard systems at any desired time.

BACKGROUND OF THE INVENTION

Airlines and other mobile platform providers, such as companies that provide passenger and/or cargo transportation by bus, train or ship, must constantly update, upgrade and reconfigure onboard computer systems with software programs and associated data files to assure the systems have the correct and up-to-date information.

Recently, some mobile platform providers have implemented mobile platform operation and maintenance enhancement systems (OMES) to provide valuable mobile platform operational, maintenance and performance information and data onboard the mobile platform. An OMES typically includes a plurality of modular, integrated hardware and software mobile platform subsystems located throughout the mobile platform that collect, compile and store various information and data, execute various software application and algorithms, and communicate with other subsystems and/or remotely located mobile platform provider central data systems.

One such modular, integrated hardware and software mobile platform subsystem is an electronic travel bag (ETB), which is a general purpose computer that provides the mobile platform crew with access to and utilization of many different software applications. For example, such an ETB can provide valuable information regarding mobile platform fuel consumption and requirements, provide GPS technology, assist in onboard surveillance, provide electronic log book applications for use by mobile platform crew to record metric and fault data, and many other tasks that simplify and improve the maintenance, operation and performance of the mobile platform. Such a mobile platform subsystem communicates with one or more remote client systems to provide a comprehensive end-to-end system that utilizes the mobile platform subsystem(s) as a "node" in the comprehensive system.

Implementation of these subsystems involves continual maintenance of software programs and associated data files to assure that the mobile platform, the OMES and the subsystems all have the correct, up-to-date data, information and configurations. Many of the subsystems have a plurality of parts, i.e. components, configuration data, data files and software applications, each of which has a related part number. In some instances, specific parts must be updated on a frequent basis. For example, national regulations require that airlines substantiate that all the airline's aircraft have systems in place to assure each aircraft and its systems meet specific configuration requirements that can change on a monthly, weekly or daily basis. This puts a burden on mobile platform configuration management, mobile platform routing operations, and mobile platform maintenance to assure that all OMES and subsystems of all mobile platforms are configured with current and up-to-date parts.

Typically, this configuration management and maintenance is done via a manual system that requires the mobile platform maintenance crews to hand load the software parts, i.e. the configuration files, data files, software applications and application databases. For example, mobile platform maintenance personnel must locate applicable drawings which define the configuration to be loaded and locate the appropriate parts, such as removable storage device. The software parts are then downloaded to a portable data loader that is then carried onto the mobile platform to download the software parts to the particular subsystems. Additionally, there is typically no automatic confirmation that the subsystems have been newly configured, other than the paperwork which accompanies the loading job. This manual process requires that the mobile platform provider develop the loading configuration, initiate paperwork to load the mobile platform, and then direct the maintenance personnel to assemble the load, e.g. with CDs or by loading a PMAT. The software parts must then be loaded on the mobile platform subsystems, and then paperwork for updating configuration management systems must be assembled after the load to assure that the mobile platforms are in the correct configuration. This is a manpower intensive task which requires access to the mobile platform and back-office support to gather the completed loading jobs and assure correct configuration.

Therefore, there is a need to automate and stream line the task of mobile platform systems and subsystems configuration management and maintenance.

BRIEF SUMMARY OF THE INVENTION

The features, functions, and advantages of the present invention can be achieved independently in various embodiments of the present inventions or may be combined in yet other embodiments.

In various preferred embodiments of the present invention a system and method is provided for loading software items on a mobile platform computer based system. Generally, a distributed data load management system (DDLMS) allows a mobile platform provider to configure software for various onboard computer systems (OCS) of the mobile platform using one or more remotely located systems of the DDLMS. The DDLMS additionally manages the software configurations and automatically targets particular software to be staged on a mobile platform without further intervention by the mobile platform provider. The DDLMS further stages the software in a mobile platform staging area repository when a wireless connection is available between a mobile platform communications system and a DDMS communications system. Further yet, the DDLMS notifies mobile platform maintenance personnel when the software has been completely staged, and also notifies back office configuration management personnel when the software has been installed. This allow for a deterministic updating of mobile platform computer systems configurations.

The method includes storing published content in a published content repository of a distributed data manager system (DDMS) included in the DDLMS. At least one assigned software part generated using the published content from the published content repository is stored in a DDMS fleet content repository. The assigned software part is communicated to the staging area repository of OCS platform over a secure link. The staged software part is transferred to an installed software parts repository of the OCS after the entire software part is staged in the staging area repository.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following descriptions of various embodiments are merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
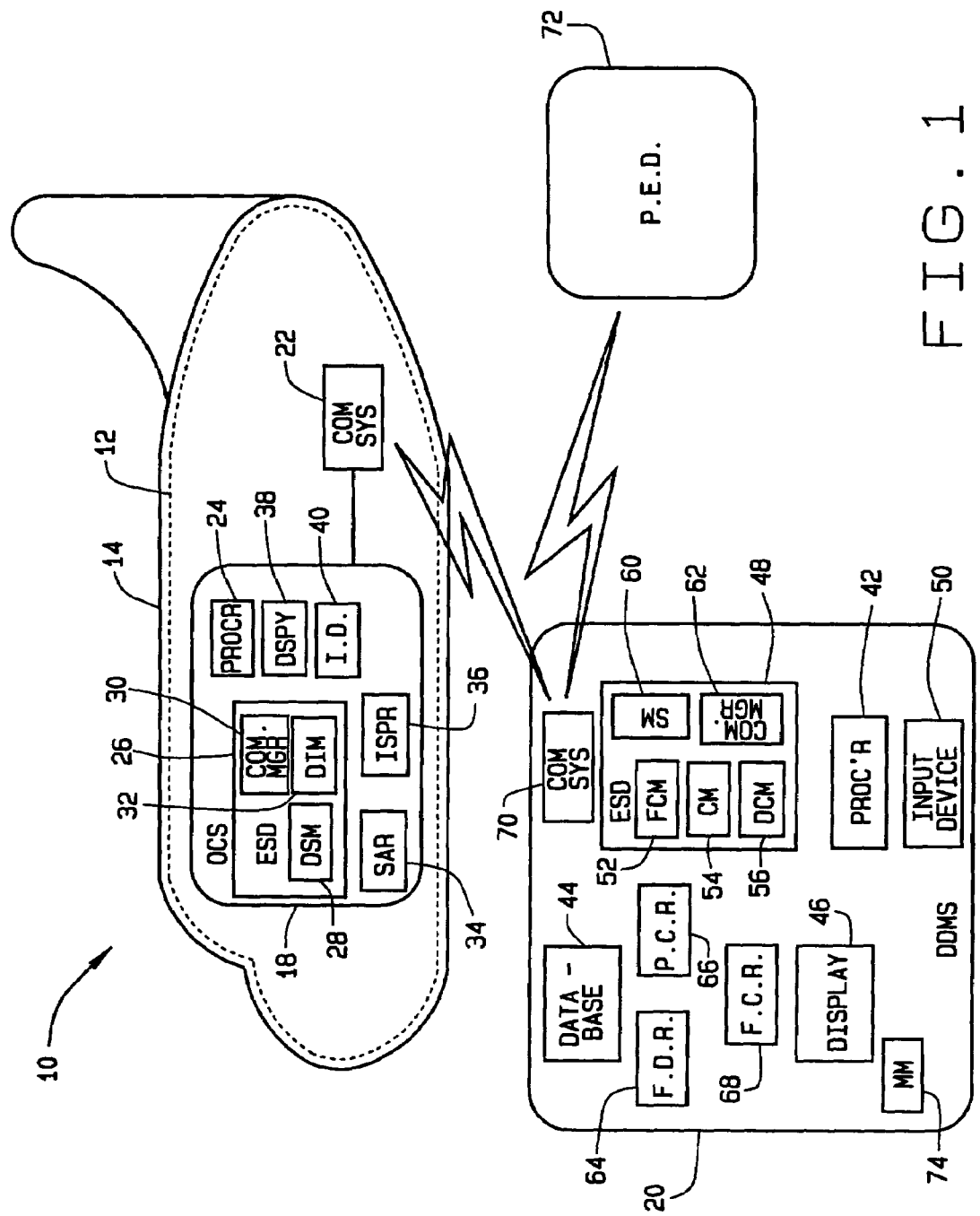
FIG. 1 is a block diagram of a mobile platform distributed data load management system (DDLMS), in accordance with various embodiments of the present invention.
Figure 2:
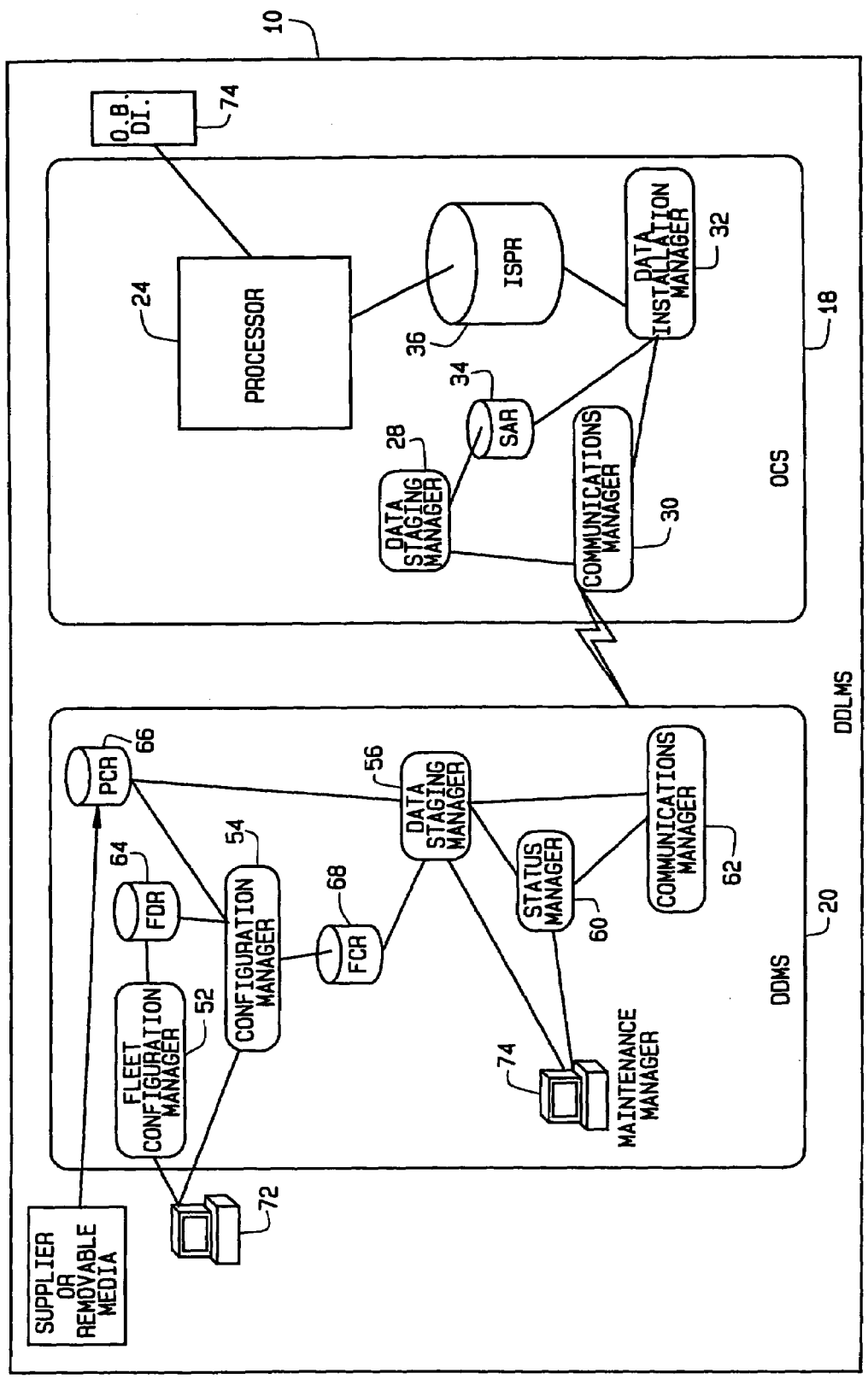
FIG. 2 is a schematic illustrating the interfacing and/or communication paths of the DDLMS shown in FIG. 1.

FIGS. 1 and 2 illustrate a mobile platform distributed data load management system (DDLMS) 10, in accordance with various embodiments of the present invention. The DDLMS 10 includes a mobile platform operation and maintenance enhancement system (OMES) 12 that provides valuable mobile platform operational, maintenance and performance information and data onboard at least one mobile platform 14. Although the mobile platform 14 is illustrated as an aircraft, the invention is not limited to aircraft applications. That is, the mobile platform 14 could be any mobile platform such as an aircraft, bus, train or ship.

The OMES 12 includes at least one onboard computer system (OCS) 18. Although FIG. 1 illustrates a single OCS 18, it should be understood that in various embodiments, the OMES 12 can include a plurality of OCSs 18. However, the DDLMS 10 will be described herein referencing at least one OCS 18. The DDLMS 10 additionally includes at least one distributed data management system (DDMS) 20 configured to wirelessly communicate with the OCS 18. More particularly, the OMES 12 further includes one or more onboard communications systems 22 that wirelessly interface with the DDMS 20. The communication system(s) 22 may communicate with the DDMS 20 using any suitable wireless communication protocol, for example, GPRS (General Packet Radio Service), VHF, wireless IEEE 802.11 communication and/or satellite networks that implement either Internet or ACARS$^{SM}$ (Airplane Communications and Recording System) protocols. ACARS$^{SM}$ can be provided by ARINC, Inc. of Annapolis, Md. or SITA of Geneva, Switzerland. The OCS 18 can interface, or communicate, with the DDMS 20 via the communications system(s) 22.

The OCS 18 can be a stand alone system or a subsystem of any other system, network or component onboard the mobile platform 14. For example, in various embodiments the OCS 18 is an electronic travel bag (ETB) utilized by an operator and/or crew of the mobile platform 14 to enhance ease and efficiency of many tasks the operator and/or crew must perform during operation of the mobile platform 14. An exemplary ETB utilized by some airlines is referred to as an electronic flight bag (EFB). Alternatively, the OCS 18 can be a subsystem of an onboard LAN or any other onboard mobile platform control system.

The OCS 18 includes a processor 24 for executing all applications, algorithms and software, and enabling all functions of the OCS 18. The OCS 18 additionally includes an electronic storage device (ESD) 26 for electronically storing a data staging manager application 28, a communications manager application 30, a data installation manager 32 and other applications, data, information and algorithms. The OCS 18 further includes a staging area repository 34 and an installed software parts repository 36. The staging area repository 34, the installed software parts repository 36 and the OCS ESD 26 can each be any alterable computer readable medium device suitable for electronically storing and allowing access to such things as data, information, algorithms and/or software applications executable by the OCS processor 24. For example, each of the repositories 34 and 36, and the OCS ESD 26 can be one or more flash memory chips, erasable programmable read-only memory (EPROM) chips or electrically erasable programmable read-only memory (EEPROM) chips. Alternatively, each of the repositories 34 and 36, and the OCS ESD 26 can be one or more hard drives, Zip drives, CDRW drives, thumb drives or any other alterable electronic storage device.

The OCS 18 additionally includes a display 38 for illustrating graphical and textual data, forms and other information, and an input device 40 such as a keyboard, mouse, stylus or joy stick for inputting data and information to the OCS 18 to be stored on the OCS ESD 26, the staging area repository 34 and/or the installed software parts repository 36. It should be understood that the OCS processor, ESD, staging area repository, installed software parts repository, display and input device, 24, 26, 34, 36, 38 and 40, respectively, can be components of a stand alone computer based system, i.e. the OCS 18, or components of a larger system, such as an onboard LAN or an onboard mobile platform control system that collectively comprise the OCS 18. Alternatively, the OCS 18 can be a stand alone system that is connectable to a larger system, e.g. an onboard LAN, such that various ones of the OCS processor, ESD, staging area repository, installed software parts repository, display and input device, 24, 26, 34, 36, 38 and 40 are included in the stand alone OCS 18 and others are included in the larger system.

The DDMS 20 includes at least one processor 42, at least one database 44, at least one display 46, at least one electronic storage device (ESD) 48 and at least one input device 50. The DDMS display 46 can be any display suitable for visually presenting graphics, text and data to a user of the DDMS 10. The DDMS input device 50 can be any device adapted to input data and/or information into DDMS 20, for example a keyboard, a mouse, a joystick, a stylus, a scanner, a video device and/or an audio device. In various embodiments, the DDMS ESD 48 has stored thereon a fleet configuration manager application 52, a configuration manager application 54, a data staging manager application 56, a status manager application 60 and a communications manager application 62. The DDMS 20 additionally includes a fleet data repository 64 for accessibly storing fleet information data that provides unique identifiers for each mobile platform 14, e.g. an aircraft tail number, and can also define collections of unique identifiers, e.g. groups of tail numbers, which represent a fleet of mobile platforms 14 with common configuration characteristics. The DDMS 20 further includes a published content repository 66 for accessibly storing data and a fleet content repository 68 for accessibly storing data, software applications and configuration files, each identified uniquely with a part number and are available to assign to a mobile platform 14 or a fleet of mobile platforms 14. The DDMS 20 further includes one or more communications systems 70 that wirelessly interface or communicate with the OCS 18, via the onboard communication system 22.

The fleet data repository 64, the published content repository 66, the fleet content repository 68 and the DDMS ESD 48 can each be any alterable computer readable medium device suitable for electronically storing and allowing access to such things as data, information, algorithms and/or software applications executable by the DDMS processor 42. For example, each of the repositories 64, 66 and 68, and the DDMS ESD 48 can be one or more flash memory chips, erasable programmable read-only memory (EPROM) chips or electrically erasable programmable read-only memory (EEPROM) chips. Alternatively, each of the repositories 64, 66 and 68, and the DDMS ESD 48 can be one or more hard drives, Zip drives, CDRW drives, thumb drives or any other alterable electronic storage device.

The DDMS database 44 is also an electronic memory device, i.e. computer readable medium, for storing large quantities of data organized to be accessed and utilized during various operation of the DDLMS 10. For example, a plurality of look-up tables containing maintenance data, fault data, maintenance procedures and mobile platform metrics may be electronically stored on the DDMS database 44 for access and use by the DDLMS 10 and users of the DDLMS 10. The DDMS processor 42 controls all operations of the DDMS 20. For example, the DDMS processor 42 controls wireless communications and data transfers between the DDMS 20 and the OCS 18 (i.e., between the onboard communications system 22 and the DDMS communication system 70), displaying graphics and data on the DDMS display 46, and interpreting and routing information and data input by the DDMS input device 50. Additionally, the DDMS processor 42 controls execution of the fleet configuration manager application 52, the configuration manager application 54, the data staging manager application 56, the status manager application 60, the communications manager application 62 and various algorithms stored on the DDMS ESD 48.

In various embodiments, the DDLMS 10 further includes a portable electronic device (PED) 72, e.g. a laptop computer, PDA or any other such device, that communicates, preferably wirelessly, with the DDMS 20. The PED 72 is adapted to access and utilize data stored in the fleet data repository 64, the published content repository 66, the fleet content repository 68 and/or the DDMS ESD 48 and also to input data to the DDMS 20 to be stored in the fleet data repository 64, the published content repository 66, the fleet content repository 68 and the DDMS ESD 48, if desirable. Generally, the PED 72 is utilized by maintenance personnel to aid in performing the maintenance and repairs to the mobile platform 14.

Figure 3:
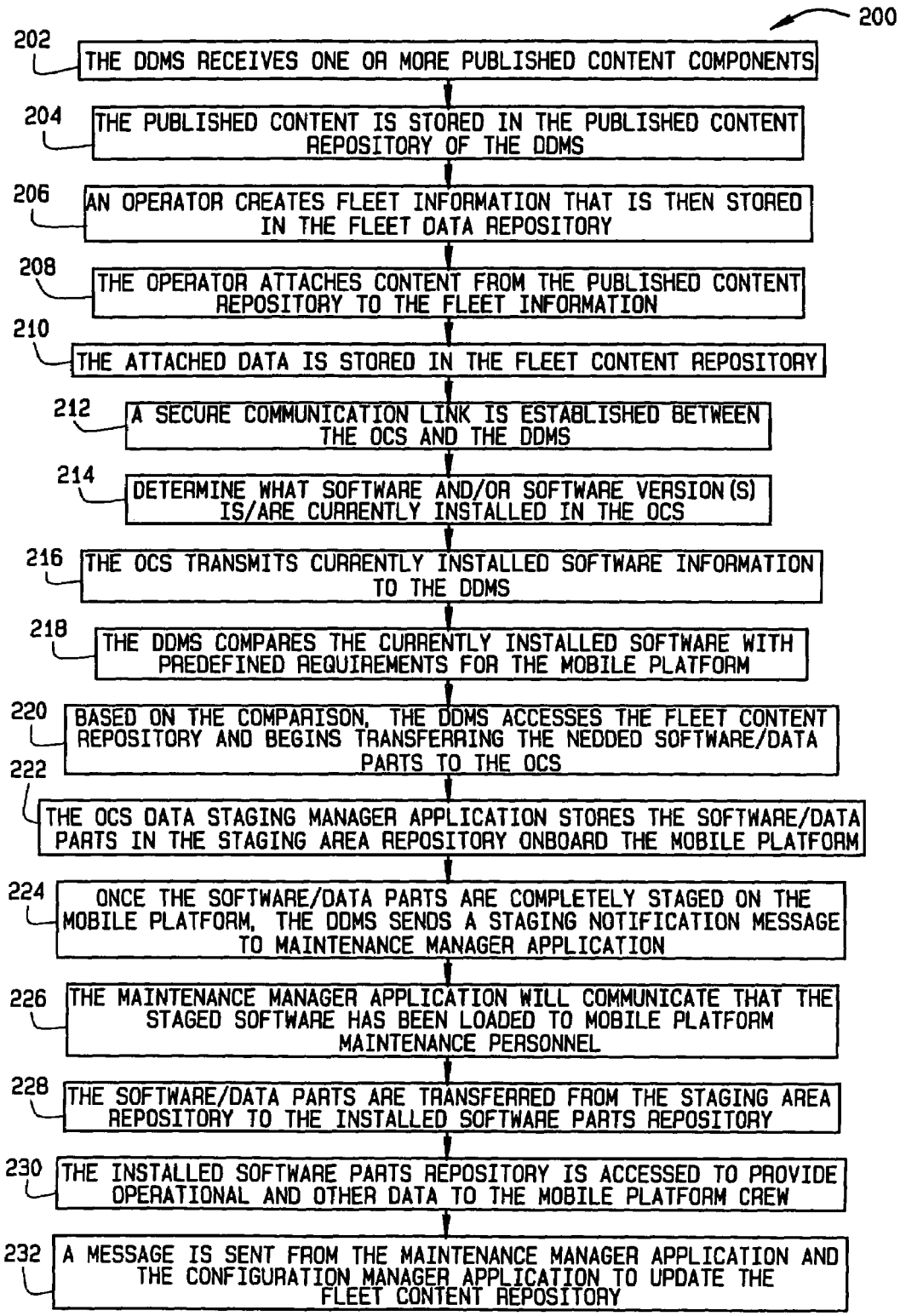
FIG. 3 is a flow chart illustrating the operation of the DDLMS shown in FIGS. 1 and 2.

FIG. 3 is a flow chart 200 illustrating an operation of the DDLMS 10. Generally, the DDLMS 10 allows a mobile platform provider to configure software for various mobile platform systems such as the OCS 18, manage the software configurations and automatically target particular software to be staged on mobile platform without further intervention by the mobile platform provider. The DDLMS 10 stages the software in the mobile platform staging area repository 34 when a wireless connection is available between the mobile platform communications system 22 and the DDMS communications system 70. The DDLMS 10 additionally notifies mobile platform maintenance personnel when the software has been completely staged and also notifies the maintenance personnel when the software has been installed.

More specifically, the DDMS 20 receives one or more published content components, as indicated at 202. The content components can be electronically delivered as part of a subscription, or a scheduled delivery of software or configuration files from a supplier of such data for the mobile platform provider. Alternatively, the mobile platform provider can load their own data directly into the published content repository 66 using electronic internal transfer or removable media such as a compact disk (CD). The published content component can be one or more software applications, algorithms, databases, configurations files and/ or any other software item that has been created and approved for installation on one or more mobile platform OCSs 18. The published content is stored in the published content repository 66 of the DDMS 20, as indicated at 204. Each of the components stored in the published content repository 66 are controlled, i.e. identified, by part numbers or subscription identifiers. A part number relates to a discrete loadable software application or package. A subscription refers to an update service which provides discrete loadable software or data updates on a periodic basis.

A mobile platform provider operator, e.g. an engineer, accesses the DDMS 20 and executes the fleet configuration manager application 52, using either the DDMS input device 50 or a remote PED, such as PED 72, to create fleet information that is then stored in the fleet data repository 64, as indicated at 206. For example, fleet information may be a collection of aircraft tail numbers that represent the same aircraft/engine type that operate on a similar route structure. In this example, a fleet could be a set of common aircrafts that are each assigned to fly North Pacific routes. All of these aircraft would require the same software, configuration data and aircraft databases. The fleet information uses discrete identifiers, for example, tail numbers for aircraft, and has the ability to uniquely identify single mobile platforms 14 or fleets of mobile platforms 14 based on common operation criterion, e.g. a number of aircraft assigned a North Pacific route. The mobile platform operator also executes the configuration manager application 54 to assign content from the published content repository 66 to the discrete identifier of a single mobile platform 14 or the discrete identifiers of a fleet of mobile platforms 14 obtained from the fleet data repository 64, as indicated at 208. The assignments are done by associating the discrete software part number or subscription numbers to the discrete identifiers of the single mobile platform 14 or the discrete identifiers of the fleet of mobile platforms 14. The assigned content, comprising the part/subscription number(s) attached to the identifiers, is stored in the fleet content repository 68, as indicated at 210.

A communication link between the DDMS 20 and the OCS 18, via communication systems 70 and 22, is achieved when the DDMS communications manager application 48 and the OCS communications manager application 30 have established a secure communications link, e.g. a virtual private network link, as indicated at 212. The secure link can be established using any suitable method, system and/or means for establishing secure wireless link or channel. For example a secure, public key based, mutually authenticated secure channel can be established utilizing the system and method described in co-pending patent application titled, "Security Certificate Management", attorney docket number 7784-000839, and assigned to The Boeing Company, which is incorporated herein by reference in its entirety.

Once the secure link is established, the DDMS processor 42 automatically executes the DDMS data staging manager application 56 and the OCS processor 24 automatically executes the OCS data staging manager application 28. The OCS data staging manager application 28 determines what software and/or software version(s) is/are currently installed in the onboard system(s), e.g. the OCS 18, as indicated at 214. The OCS data staging manager application 28 then transmits this information to the DDMS data staging manager application 56, as indicated at 216. The DDMS data staging manager application 28 compares the currently installed software and the state of the staging area repository 34 (to check for incomplete staged content) with predefined requirements for the mobile platform 14 that are stored in the fleet content repository 68, as indicated at 218. Based on the comparisons, the DDMS data staging manager application 56 accesses the fleet content repository 68 and begins transferring the needed software/data parts from the fleet content repository 68 over the secure communications link to the OCS data staging manager application 28, as indicated at 220. The OCS data staging manager application 28 then stores the software/data parts in the staging area repository 34 onboard the mobile platform 14, as indicated at 222. The DDMS data staging manager application 56 and the OCS data staging manager application 28 include a "check/restart" function which can detect interrupted data transfers and reliably resume the transfer of the software/data parts after the interrupted segment. The partial transfers are also stored in the staging area repository 34 onboard the mobile platform 14.

During the staging process the DDMS status manager application 60 receives the transfer status messages from the OCS data staging manager application 28 indicating the completeness of the software/data parts transfer. Once the software/data parts are completely staged on the mobile platform 14, i.e. stored in the staging area repository 34, the DDMS status manager application 60 sends a staging notification message to a maintenance manager application 74, as indicated at 224. In various embodiments, the maintenance manager application 74 is included in the DDMS 20. The maintenance manager application 74 also monitors the status of the OCS data staging manager application 28 throughout the staging process and can delete staged software parts from the staging area repository 34.

When the maintenance manager application 74 receives notification of the completely staged loads, the maintenance manager application 74 will communicate a message, using established mobile platform provider procedures, to mobile platform maintenance personnel indicating that the software/data parts have been completely staged to the staging area repository 34, as indicated at 226. For example, the maintenance manager application 74 will send a 'staging complete' message to the PED 72. Mobile platform maintenance personnel will then execute the data installation manager application 32 to install the software/data parts by transferring the data/software parts from the staging area repository 34 to the installed software parts repository 36, as indicated at 228. In various embodiments, the mobile platform utilizes an onboard display interface 76 to execute the data installation manager application 32. Once the software/data parts are stored in the installed software parts repository 36, the software/data parts stored in the installed software parts repository 36 can be accessed by the OCS processor 24 to provide operational and other data to the mobile platform crew, as indicated at 230. Additionally, after the data installation manager application 32 completes installation of the software/data parts in the installed software parts repository 36, a message is sent from the data installation manager application 32 to the maintenance manager application 74 and the configuration manager application 54 to update the fleet content repository 68, as indicated at 232.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for loading software items on a mobile platform computer based system, said method comprising:
    storing published content in a published content repository of a distributed data manager system (DDMS);
    storing at least one assigned software part generated using the published content from the published content repository in a DDMS fleet content repository;
    communicating portions of the stored assigned software part to be staged in a staging area repository of an onboard computer system (OCS) of the mobile platform over a secure link until the entire assigned software part is stored in the staging area repository; and
    aggregating the staged portions and transferring the aggregated staged software part to an installed software parts repository of the OCS after the entire software part is staged in the staging area repository.

2. The method of claim 1, wherein storing the assigned software part in the DDMS fleet content repository comprises:
    storing fleet information in a fleet data repository; and
    associating at least a portion of the published content stored in the published content repository with fleet information from the fleet data repository regarding at least one particular mobile platform to create at least one assigned software part.

3. The method of claim 1, wherein communicating the assigned software part comprises determining what software is currently installed in the OCS.

4. The method of claim 3, wherein communicating the assigned software part further comprises comparing the software that is currently installed with predefined software requirements of the OCS.

5. The method of claim 4, wherein communicating the assigned software part comprises accessing the fleet content repository to retrieve the assigned software part based on the comparison.

6. The method of claim 5, wherein communicating the assigned software part further comprises communicating consecutive portions of the assigned software part to the staging area repository.

7. The method of claim 6, wherein transferring the staged software part to the installed software part repository comprises sending a message to mobile platform maintenance personnel when the entire software part has been staged to the staging area repository.

8. The method of claim 7 wherein, transferring the staged software part to the installed software part repository further comprises enabling the maintenance personnel to access a data installation manager application to transfer the staged software part to the installed software part repository.

9. A method for loading software items on a mobile platform computer system, said method comprising:
    storing published content in a published content repository of a distributed data manager system (DDMS);
    associating at least a portion of the published content with fleet information regarding at least one particular mobile platform to create at least one assigned software part;

storing the assigned software part in a DDMS fleet content repository;

establishing a secure wireless communication link between the DDMS and the mobile platform;

communicating the assigned software part to the mobile platform over the secure link;

storing the software part in a staging area repository of an onboard computer system (OCS) of the mobile platform;

transferring the staged software part from the staging area repository to an installed software parts repository onboard the mobile platform after the software part is completely communicated from the DDMS and stored in the staging area repository; and accessing the installed software parts repository to provide operational data to a mobile platform crew.

10. The method of claim 9, wherein associating the published content comprises storing fleet information in a fleet data repository.

11. The method of claim 9, wherein communicating the assigned software part comprises determining what software is currently installed in the OCS.

12. The method of claim 11, wherein communicating the assigned software part further comprises comparing the software that is currently installed with predefined software requirements of the OCS.

13. The method of claim 12, wherein communicating the assigned software part comprises accessing the fleet content repository to retrieve the assigned software part based on the comparison.

14. The method of claim 13, wherein communicating the assigned software part further comprises communicating consecutive portions of the assigned software part to the staging area repository.

15. The method of claim 14, wherein transferring the staged software part to the installed software part repository comprises sending a message to mobile platform maintenance personnel when the entire software part has been staged to the staging area repository.

16. The method of claim 15 wherein, transferring the staged software part to the installed software part repository further comprises enabling the maintenance personnel to access a data installation manager application to transfer the staged software part to the installed software part repository.

17. A system for loading software items on a mobile platform computer system, said system comprising:

a distributed data manager system (DDMS) including:

a published content repository for storing published content relating to at least one software item for at least one computer systems of the mobile platform; and a fleet content repository for storing at least one assigned software part generated using the published content from the published content repository;

an onboard computer system (OCS) of the mobile platform, the OCS including:

a staging area repository for storing staged portions of the assigned software part communicated from the fleet content repository over a secure link established between the mobile platform and the DDMS; and an installed software parts repository for receiving an aggregation of the staged portions of the software part transferred from the staging area repository after the entire software part has been staged in the staging area repository.

18. The system of claim 17, wherein the DDMS further comprises a fleet data repository for storing fleet information regarding at least one mobile platform, wherein to store the assigned software part in the fleet content repository, the DDMS is adapted to associate at least a portion of the published content stored in the published content repository with fleet information from the fleet data repository to create at least one assigned software part.

19. The system of claim 17, wherein to communicate the assigned software part from the fleet content repository to the staging area repository, the DDMS is adapted to determine what software is currently installed in the OCS.

20. The system of claim 19, wherein to communicate the assigned software part from the fleet content repository to the staging area repository, the DDMS is further adapted to compare the software that is currently installed with predefined software requirements of the OCS.

21. The system of claim 20, wherein to communicate the assigned software part from the fleet content repository to the staging area repository, the DDMS is further adapted to access the fleet content repository to retrieve the assigned software part based on the comparison.

22. The system of claim 21, wherein to transfer the entire software part from the staging area repository to the installed software parts repository, the DDMS is further adapted to send a message to mobile platform maintenance personnel when the entire software part has been staged to the staging area repository.

23. The system of claim 22 wherein, wherein to transfer the entire software part from the staging area repository to the installed software parts repository, the OCS is adapted to enable the maintenance personnel to access a data installation manager application to transfer the staged software part to the installed software part repository.

* * * * *